April 8, 1930.   A. J. TIMONEY   1,753,222
MOTION PICTURE PROJECTING DEVICE
Filed May 6, 1929
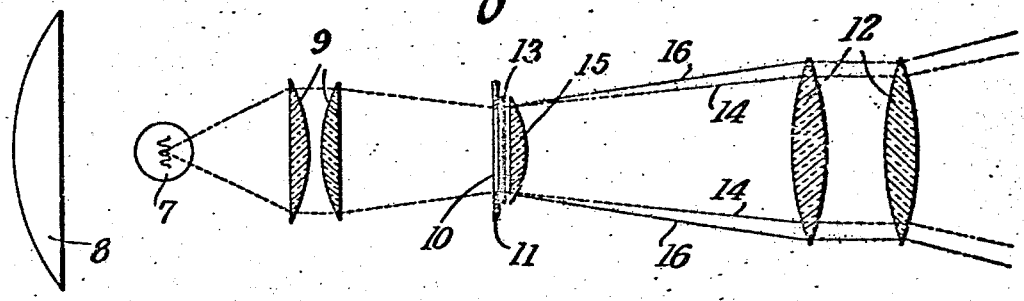
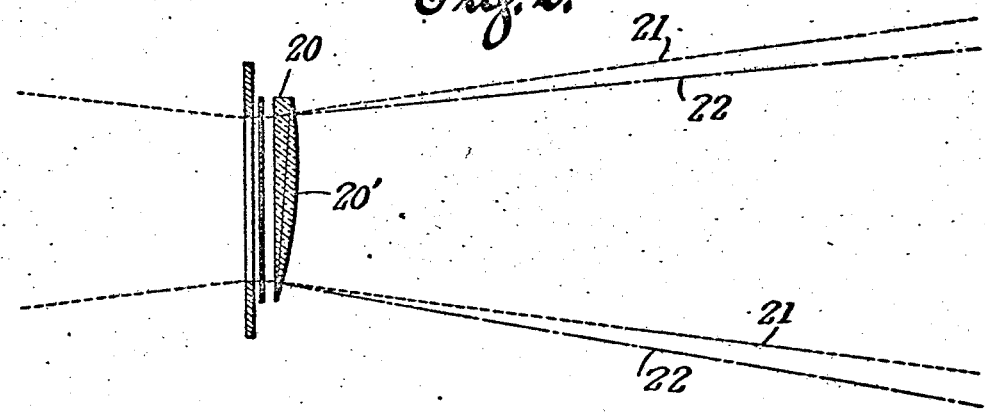
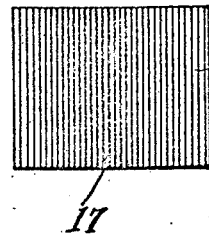
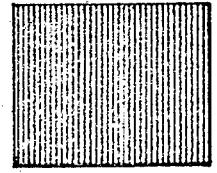
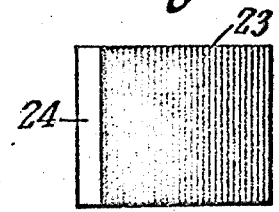

Patented Apr. 8, 1930

1,753,222

UNITED STATES PATENT OFFICE

ANDREW J. TIMONEY, OF NEW YORK, N. Y., ASSIGNOR OF ONE-HALF TO HAROLD WILLIAMS AND GUS DURKIN, OF NEW YORK, N. Y.

MOTION-PICTURE-PROJECTING DEVICE

Application filed May 6, 1929. Serial No. 360,894.

This invention relates to motion picture projection machines, and more particularly to devices for diminishing the distortional effects of such machines.

In the projection of motion pictures it is well known that the pictures thrown upon a screen are distorted by the aberration in the spherical objective lenses in the projection tube. This distortion is most noticeable in a vertical direction, being a minimum at the center of the projected picture and increasing towards the edges. The error cannot be entirely corrected in the most expensive of lenses, and the type of lens generally used in motion picture projection machines has a large error of distortion.

In the "movietone" type of talking motion picture, the sound record is carried directly on the film, and inasmuch as the film is maintained at a standard width so that it will fit standard projection machines, it is necessary to decrease the width of the picture in order to accommodate the sound record strip. As a result, the "movietone" picture is square instead of oblong as has heretofore been the case with the standard picture, the sound strip being shielded so that it will not show on the screen. In order to present a "movietone" picture which is oblong in shape, expedients such as shutters to cut off a portion of the top and bottom of the picture have been resorted to. However, such expedients are objectionable in that the picture is diminished in size, and the shutters are inconvenient to manipulate and unsatisfactory in other respects.

It is, therefore, an object of this invention to provide a device which may be attached to a standard motion picture machine to counteract the distortional effect of lens provided with such a machine.

A further object is the provision of a device for spreading or widening the screen projection of a picture from the usual "movietone" film.

A further object is the provision of a device for shifting the projection of a "movietone" film so that it will be properly centered on a standard motion picture screen.

These and other objects are attained by the novel construction, combination and arrangement of parts hereinafter described and shown in the accompanying drawing, constituting a material part of this disclosure and in which:

Figure 1 is a plan view of the optical system of a motion picture projecting machine embodying my invention.

Figure 2 is a plan view of a portion of an optical system employing my device for shifting and spreading a picture projected from a "movietone" film.

Figure 3 is a diagrammatic view indicating the distortion in the usual picture projected upon a screen.

Figure 4 is a similar view showing the manner in which the picture is widened and the distortion overcome when my device is employed in combination with a standard projecting machine.

Figure 5 is a diagrammatic view showing the usual projection of a "movietone" film on a screen.

Referring to the drawings, in Figure 1 is shown the optical system of a standard motion picture projection machine, which comprises an illuminating source 7, a reflecting mirror 8, condensing lens 9, an aperture 10 in a casing 11, and the objective lenses 12. The film 13 is passed adjacent the aperture 10 between the casing 11 and the objective lens 12, and the light rays generally follow a path indicated by the dotted lines 14. When a picture is projected upon a screen by such an optical system, the projection will have the characteristics shown in Figure 3, in which there is a substantially undistorted portion 17 and distorted edges 18.

In order to overcome this objection in the projected picture, I position as close to the film as practicable a cylindrical lens 15, which spreads the light beam so that the rays follow a path indicated in Figure 1 by the lines 16, and causes a distortion sufficient to counteract the distortion normally present in the objective lenses 12, with the result that the projected picture is spread or widened, and appears on the screen substantially undistorted, as shown in Figure 3.

In the projection of a "movietone" film compensation must be made for the decreased width of the picture due to the sound record strip, and in Figure 2 is shown an attachment which comprises a combined prismatic and cylindrical lens 20, 20', which shifts and spreads the light beam. The dotted lines 21 indicate the path of the rays generally when the cylindrical lens is employed alone for spreading the beam, and the lines 22 indicate generally the path of the rays after they have been shifted by the prismatic lens 20 to properly center the picture relative to the screen. With this attachment the square picture film of the "movietone" will be so projected as to completely cover the screen, and present a properly centered picture having the oblong shape so familiar to motion picture audiences.

In Figure 5 is indicated the normal projection of a "movietone" film, in which the picture is shown at 23 and a portion 24 of the screen is left blank due to the shielding of the sound strip on the film. In Figure 4 is indicated the projection of a "movietone" film when my prismatic-cylindrical lens is employed, the picture being properly centered and having the desired oblong shape.

The use of cylindrical lens not only widens the projection and diminishes the distortional effects of the objective lens, but also has a tendency to give depth to the projected picture so as to produce a highly desirable three-dimensional effect.

While the characteristics of prismatic and cylindrical lens are well known, the combination of such lens with a motion picture projection machine to widen and shift the projected beam has heretofore been unknown. From the above description it will be seen that I have provided a simple and convenient expedient to overcome distortional effects and compensate for the sound record strip on "movietone" films. My lens attachment may be initially set for a particular projecting machine, and thereafter require no further adjustments, this constituting a distinct advantage over the usual shutters and other inconvenient attachments at present employed on projecting machines in an attempt to attain a similar result.

While the drawings disclose my lens set at a certain axis and transposition, it is obvious that they may be placed at any axis or transposition to obtain different sizes, shapes, and images on a screen.

The foregoing disclosure is to be regarded as descriptive and illustrative only, and not as restrictive or limitative of the invention, of which obviously an embodiment may be constructed including many modifications without departing from the general scope herein indicated and denoted in the appended claim.

Having thus described my invention, what I claim as new and desire to secure by Letters Patent, is:

In combination with the optical system of a motion picture machine for projecting film having decentered images, an attachment comprising a combined prismatic and cylindrical lens positioned intermediate the objective lens and the gate of the machine, said combined lens serving to shift projected images to the center of a screen and spread the images laterally to cover the entire screen.

In testimony whereof I affix my signature.

ANDREW J. TIMONEY.